(12) United States Patent
Mizrahi

(10) Patent No.: US 8,948,037 B1
(45) Date of Patent: Feb. 3, 2015

(54) CHECKSUM TRAILER IN TIMING PROTOCOLS

(75) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 239 days.

(21) Appl. No.: 13/533,952

(22) Filed: Jun. 26, 2012

Related U.S. Application Data

(60) Provisional application No. 61/503,821, filed on Jul. 1, 2011.

(51) Int. Cl.
*H04J 1/16* (2006.01)
*H04L 12/28* (2006.01)

(52) U.S. Cl.
USPC .......................... 370/252; 370/392; 370/400

(58) Field of Classification Search
USPC ................... 370/252, 392, 400, 474
See application file for complete search history.

(56) References Cited

U.S. PATENT DOCUMENTS

| | | | | |
|---|---|---|---|---|
| 2005/0007988 | A1* | 1/2005 | Ferris et al. | 370/349 |
| 2007/0286073 | A1* | 12/2007 | Pullen et al. | 370/229 |
| 2009/0083372 | A1* | 3/2009 | Teppler | 709/203 |
| 2010/0182911 | A1* | 7/2010 | Pullen et al. | 370/241 |
| 2010/0208728 | A1* | 8/2010 | Michaelis et al. | 370/389 |
| 2010/0254398 | A1* | 10/2010 | Jean | 370/401 |
| 2012/0014377 | A1* | 1/2012 | Joergensen et al. | 370/352 |

OTHER PUBLICATIONS

IEEE 1588™ 2008 (Revision of IEEE Std. 1588-2002) "IEEE Standard for a Precision Clock Synchronization Protocol for Networked Measurement and Control Systems," *The Institute of Electrical and Electronics Engineers, Inc.*, Jul. 2008.
Hedayat et al., "A Two-Way Active Measurement Protocol (TWAMP)," Request for Comments: 5357, Internet Engineering Task Force (IETF), Oct. 2008.
Shalunov et al., "A One-Way Active Measurement Protocol (OWAMP)," Request for Comments: 4656, Internet Engineering Task Force (IETF), Sep. 2006.
Mills et al., "Network Time Protocol Version 4: Protocol and Algorithms Specification Abstract," Request for Comments: 5905, Internet Engineering Task Force (IETF), Jun. 2010.
Postel, "User Datagram Protocol," Request for Comments: 768, Internet Engineering Task Force (IETF), Aug. 1980.
Rijsinghani, "Computation of the Internet Checksum via Incremental Update," Request for Comments: 1624, Internet Engineering Task Force (IETF), May 1994.
Deering et al., "Internet Protocol Version 6 (IPv6) Specification," Request for Comments: 2460, Internet Engineering Task Force (IETF), Dec. 1998.

* cited by examiner

*Primary Examiner* — Andrew Lee

(57) ABSTRACT

In a method for processing data packets in accordance with a timing protocol, a data packet that includes i) a checksum and ii) a timestamp is received. The timestamp is modified to generate a modified timestamp and a checksum trailer value is determined to maintain correctness of the checksum in the data packet having the modified timestamp. Additionally, at least a portion of a field of the data packet is set to the checksum trailer value, where the field is defined by the timing protocol for use other than a checksum trailer.

20 Claims, 6 Drawing Sheets

CHECKSUM TRAILER IN TIMING PROTOCOLS

CROSS-REFERENCE TO RELATED APPLICATION

This application claims the benefit of U.S. Provisional Patent Application No. 61/503,821 entitled "UDP Checksum Trailer in Timing Protocols," filed on Jul. 1, 2011, the entire disclosure of which is hereby incorporated by reference herein.

FIELD OF THE DISCLOSURE

The present disclosure relates generally to communication packets and, more particularly, to checksums in the communication packets.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Communication packets often include checksums used by receiving nodes in a network to verify integrity of the received communication packets. In some situations, an intermediate node that processes a communication packet modifies the communication packet, for example to add or to modify a timestamp. Although integrity of the communication packet remains otherwise sound, the newly added or modified timestamp will invalidate the checksum. In such situations, the checksum may be assigned a value of zero, which causes the receiving device to ignore the checksum value, in which case, the receiver is unable to verify the integrity of the received communication packet.

SUMMARY

In an embodiment, a method for processing data packets in accordance with a timing protocol includes receiving a data packet, wherein the data packet includes i) a checksum and ii) a timestamp. The method also includes modifying the timestamp to generate a modified timestamp and determining a checksum trailer value to maintain correctness of the checksum in the data packet having the modified timestamp. The method further includes setting at least a portion of a field of the data packet to the checksum trailer value, wherein the field is defined by the timing protocol for use other than a checksum trailer.

In another embodiment, an apparatus for processing a data packet in accordance with a timing protocol includes a packet processor configured to receive the data packet, wherein the data packet includes i) a checksum and ii) a timestamp. The apparatus also includes a timestamp modifier configured to modify the timestamp to generate a modified timestamp, and a checksum trailer determination unit configured to determine a checksum trailer value to maintain correctness of the checksum of the data packet including the modified timestamp. The apparatus further includes a field modifier unit configured set at least a portion of a field of the data packet to the checksum trailer value, wherein the field is defined by the timing protocol for use other than a checksum trailer.

In yet another embodiment, a communication system configured to operate according to a timing protocol comprises an intermediate node configured to receive a data packet, wherein the data packet includes i) a checksum and ii) a timestamp. The intermediate node is also configured to modify the timestamp to generate a modified timestamp and determine a checksum trailer value to maintain correctness of the checksum in the data packet having the modified timestamp. The intermediate node is further configured to set at least a portion of a field of the data packet to the checksum trailer value, wherein the field is defined by the timing protocol for use other than a checksum trailer. The intermediate node is further still configured to transmit the data packet having the modified timestamp. The communication system also comprises a receiving node configured to receive the data packet having the modified timestamp transmitted by the intermediate node, and to calculate a checksum for the data packet using the field that includes the checksum trailer value. The receiving node is also configured to interpret the field that includes the checksum trailer value according to the timing protocol.

DETAILED DESCRIPTION

Example methods and apparatus are described herein in the context of Ethernet networks. One of ordinary skill in the art will recognize, in light of the disclosure and teachings herein, that similar methods and apparatus are suitable for use in other communication networks as well.

Figure 1:
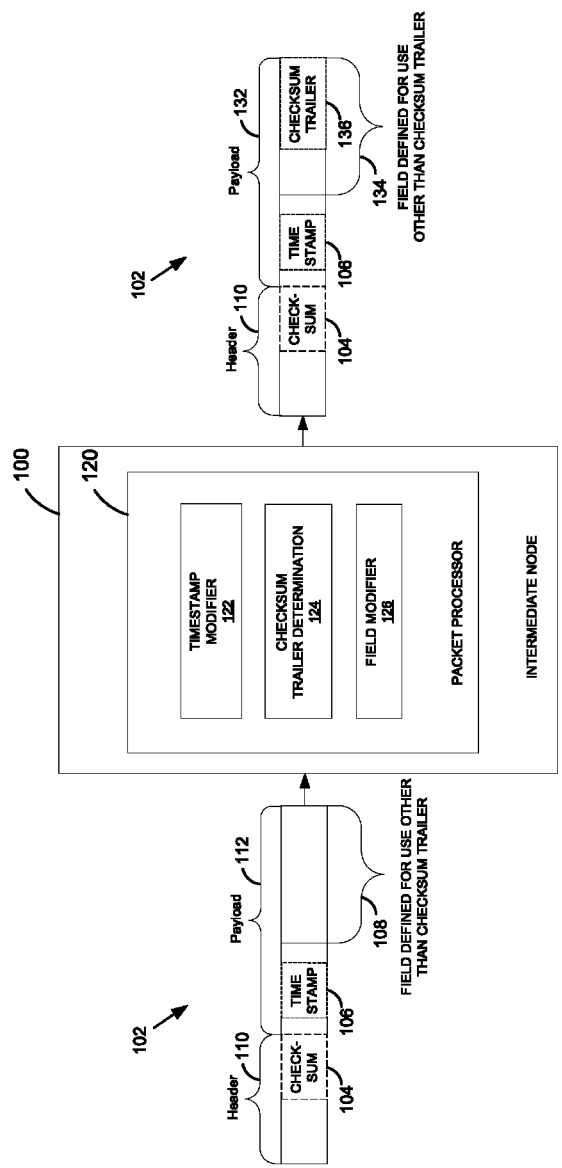
FIG. 1 is a diagram of in example intermediate node in a network, according to an embodiment.

FIG. 1 is a block diagram of an intermediate node 100 configured to operate according to a timing protocol and capable of changing or modifying a portion of a packet payload while maintaining correctness of a checksum value included in the packet, according to an embodiment. In an embodiment, the intermediate node 100 is configured to operate according to the Network Time Protocol version 4 (NTPv4), generally used for clock synchronization. In another embodiment, the intermediate node 100 is configured to operate according to a One-Way Active Measurement Protocol (OWAMP), generally used for one-way packet delay, one way packet loss, or other one way metrics, between network devices. In another embodiment, the network protocol is a Two-Way Active Measurement Protocol (TWAMP), generally used for two-way (round trip) path delay measurement and other round trip metrics between network devices. In other embodiments, the intermediate node 100 is configured to operate according to another suitable timing protocol. In general, as used herein, a timing protocol refers to any networking protocol used by network devices for any suitable timing related procedures, such as clock synchronization, path delay measurements, other path metrics measurements, etc. Further, as used herein, the term "timing packets" refers to data packets formatted according to a timing protocol and used for conducting time related procedures. As used herein, the terms "timing packet" and "data packet" are used interchangeably unless indicated otherwise.

Referring to FIG. 1, the intermediate node 100 includes a packet processor 120 which includes a timestamp modifier unit 122, a checksum trailer computation unit 124, and a field modifier unit 126. In an embodiment, the packet processor 120 receives a timing packet 102 which includes a header portion 110 and a payload portion 112. In one embodiment, the timing packet 102 conforms to the NTP protocol layered over the user datagram protocol (UDP) and transmitted over the internet protocol (IP) version 4 (IPv4) or IP version 6 (IPv6). In another embodiment, the timing packet 102 conforms to the OWAMP (or TWAMP) protocol layered over UDP and transmitted over IPv4 or IPv6. In an embodiment, the timing packet 102 includes a checksum field 104 in a header portion 110 and a timestamp field 106 in a payload portion 112. In various embodiments, a value of the checksum field 104 is computed across a number of fields of the timing packet 102 including the payload portion 112 (and, accordingly, the timestamp field 106) of the timing packet 102. For example, in an embodiment in which the timing packet 102 is a UDP datagram transmitted over IPv4 or IPV6, the value of the checksum field 106 is computed, in accordance with the UDP protocol, based on a pseudo header of information from the header 110 and the payload 112. In such embodiments, a change in a field of the payload 112 by the intermediate node 100, such as a change in the timestamp field 106, will typically result in an incorrect value of the checksum field 104 when the checksum for the packet 102 is calculated at a receiving device. In such situations, the value of the checksum field needs to also be updated to reflect the change to the payload portion 112. However, in some embodiments, changing the value of the checksum field 104 after performing a modification to payload portion 112 is inefficient or not possible. For example, in some embodiments, the packet processor 110 processes the timing packet 102 in a serial manner and, in this case, it may be inefficient to modify the checksum field 104 after modifying the payload portion 112 because processing of the checksum field 104 has already been completed prior to the payload modification.

Accordingly, in an embodiment, in order to maintain the correctness of the checksum field 104 without actually changing the value of the checksum field 104, the packet processor 110 computes a checksum trailer value based on the modified payload field and sets a subsequent field (or a portion of a subsequent field) in the payload portion 112 to the checksum trailer value. In an embodiment, the checksum trailer value is a value computed based on a modified payload field (e.g., the timestamp field 106) to compensate for the modification with respect to the value of the checksum field 104 and to thereby maintain correctness of the checksum field 104. In operation, the checksum trailer computation unit 124 performs an incremental computation based on the modified field of the payload portion 112 to determine the checksum trailer value that will maintain the correctness of the checksum. An example incremental checksum value computation technique used in some embodiments can be found in Rijsinghani, "Computation of the Internet Checksum via Incremental Update," Request for Comments 1624, Internet Engineering Task Force, May 1994, which is hereby incorporated herein by reference in its entirety. The field modifier unit 126 then sets at least a portion of a subsequent field in the payload portion 112 to the checksum trailer value computed based on the modified payload portion 112. In the embodiment illustrated in FIG. 1, the field modifier unit 126 sets a portion of a field 108 of the timing packet 102 (at the input to the intermediate node 100) to the computed checksum trailer value, as indicated in FIG. 1 by the checksum trailer value 136 in a field 134 of the data packet 102 (at the output of the intermediate node 100). The field 134 of the timing packet 102 at the output of the intermediate node 100 is generally the same as the field 108 of the data unit 102 at the input to the intermediate node 100, except that the field 134 has been modified by the field modifier unit 126 to include the checksum trailer value, according to an embodiment.

In some embodiments, the timing protocol being utilized does not specify a field specifically dedicated for use as a checksum trailer field. As will be discussed in more detail below, in such embodiments, the field modifier unit 126 includes the checksum trailer value in a field defined by the timing protocol for use other than the checksum trailer, by setting at least a portion of the field to the checksum trailer value. For example, the field modifier unit 126 includes the checksum trailer value in the timing packet 102 in a padding field or in an extension field of the timing packet 102, according to some such embodiments. In an embodiment, the particular field of the data packet 10 in which to include the checksum trailer value is selected by the packet processor 120 based on which particular timing protocol is being utilized.

Figure 2A:
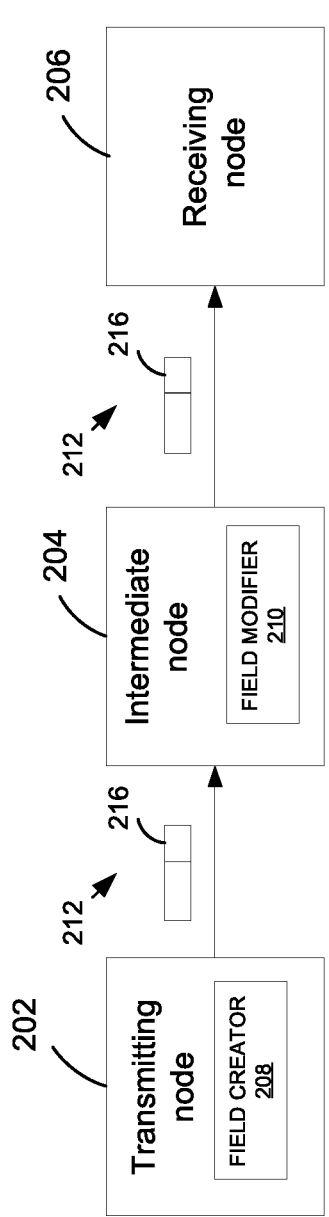
FIG. 2A is a block diagram of an example network that includes an intermediate node, according to an embodiment.

FIG. 2A is a block diagram of an example network that includes an intermediate node 204 in an example arrangement between a transmitting node 202 and a receiving node 206, according to an embodiment. In an embodiment, the intermediate node 204 is the same as or similar to the intermediate node 100 of FIG. 1. In the embodiment of FIG. 2A, the intermediate node 204 is a network device separate from the transmitting node 202. As an example, in an embodiment, the transmitting node 202 is a part of a server or another network device that originates a timing packet, and the intermediate node 204 is a switching device that serves as a "transparent clock" by updating a timestamp in the timing packet to compensate for a variable delay that the timing packet is subject to as the timing packet traverses the intermediate node 204 thereby improving accuracy of time distribution across the network.

In an embodiment, the transmitting node 202 generates a timing packet 212 and transmits the timing packet 212 to the intermediate node 204. In generating the timing packet 212, a field creator unit 208 of the transmitting node 202 includes in the timing packet 212 a field 216 that the intermediate node 234 can use to include a checksum trailer value in the timing packet 212 to maintain correctness of a checksum for the timing packet 212 when the timing packet 212 is modified by the intermediate node 204. According to an embodiment, the field creator unit 208 includes the field 216 in a portion of the timing packet that follows a timestamp field to allow the intermediate node 204 to serially process the timing packet 212 by first modifying the timestamp and then setting at least a portion of the field 216, subsequent to the timestamp field, to the checksum trailer value. In one embodiment, the field 216 is the last field of a payload portion of the timing packet 212. In some embodiments, the field 216 of the timing packet 212 is a field not specifically defined for a checksum trailer by the timing protocol being utilized. For example, in some embodiments, the field 216 of the timing packet 212 is an extension field, a padding field, or another field not specifically defined by the timing protocol for use as a checksum trailer field.

With continued reference to FIG. 2A, the intermediate node 204 includes a field modifier unit 210 that modifies the field 216 of the timing packet 212 to include a checksum trailer value in the timing packet 212. In an embodiment, the intermediate node 204 then transmits the timing packet 212 having the checksum trailer value in the field 210 to the receiving node 206. According to an embodiment, the receiving node 206 need not be aware of the presence of the checksum trailer value in the field 216 and need not be configured to interpret the field 216 as a checksum trailer field. That is, in an embodiment, the receiving node 206 is configured to process the timing packet 212 in accordance with the timing protocol and, accordingly, is configured to interpret the field 216 of the timing packet 212 in accordance with the definition of the field 216 (e.g., a padding field, an extension field, etc.) as defined by the timing protocol.

Figure 2B:
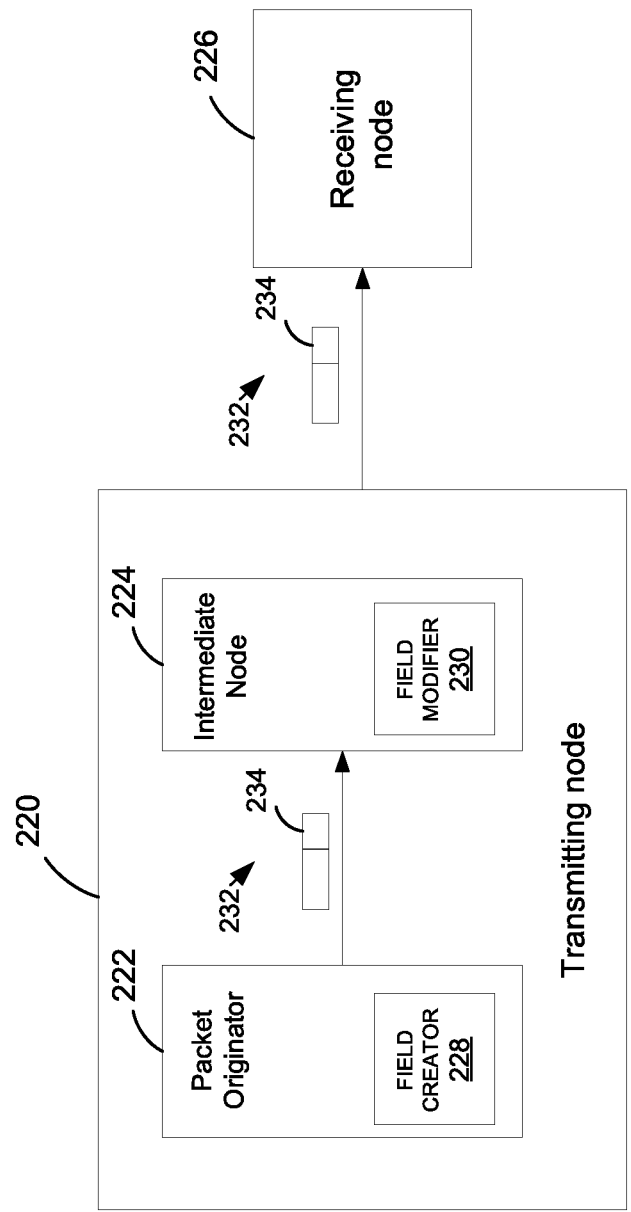
FIG. 2B is a block diagram of another example network that includes an intermediate node, according to another embodiment.

FIG. 2B is a block diagram of an example network that includes an intermediate node 224 in an example arrangement between an originating node 222 and a receiving node 226, according to an embodiment. In an embodiment, the intermediate node 224 is the same as or similar to the intermediate node 100 of FIG. 1. In the embodiment of FIG. 2B, the originating node 222 and the intermediate node 224 are disposed in the same network device (the transmitting node 220). In an embodiment, the originating node 222 is a central processing unit (CPU) or another controller that generates a timing packet 232, and the intermediate node 224 is a field programmable gate array (FPGA), an application-specific integrated circuit (ASIC), or another hardware component in the transmitting node 220 that inserts a more accurate timestamp in the timing packet 232 (or updates a timestamp with a more accurate time) before the timing packet 232 is transmitted to the receiving node 226.

In an embodiment, the packet originator 222 generates a timing packet 232 and passes the timing packet 232 to the intermediate node 224. In generating the timing packet 232, a field creator unit 228 of the packet originator 222 includes in the timing packet 232 a field 234 that the intermediate node 234 can use to include a checksum trailer value in the timing packet 232 to maintain correctness of the checksum in the timing packet 232 when the timing packet 232 is modified by the intermediate node 224. According to an embodiment, the field creator unit 228 includes the field 234 in a portion of the timing packet that follows a timestamp field to allow the intermediate node 224 to serially process the timing packet 232 by first modifying the timestamp and then setting at least a portion the field 234, subsequent to the timestamp field, to the checksum trailer value. In one embodiment, the field 234 is the last field of a payload portion of the timing packet 232. In some embodiments, the field 234 of the timing packet 232 is a field not specifically defined for a checksum trailer by the timing protocol being utilized. For example, in some embodiments, the field 234 of the timing packet 232 is an extension field, a padding field, or another field not specifically defined by the timing protocol for use as a checksum trailer field.

With continued reference to FIG. 2B, the intermediate node 224 includes a field modifier unit 230 (same as or similar to the field modifier unit 210 of FIG. 2A) that modifies the field 234 of the timing packet 232 to include a checksum trailer value in the timing packet 232. In an embodiment, the transmitting node 220 then transmits the timing packet 232 having the checksum trailer value in the field 234 to the receiving node 226. According to an embodiment, the receiving node 226 need not be aware of the presence of the checksum trailer value in the field 234 and need not be configured to interpret the field 234 as a checksum trailer field. That is, in an embodiment, the receiving node 226 is configured to process the timing packet 232 in accordance with the timing protocol and, accordingly, is configured to interpret the field 234 of the timing packet 232 in accordance with the definition of the field 234 (e.g., a padding field, an extension field, etc.) as defined by the timing protocol.

Figure 3:
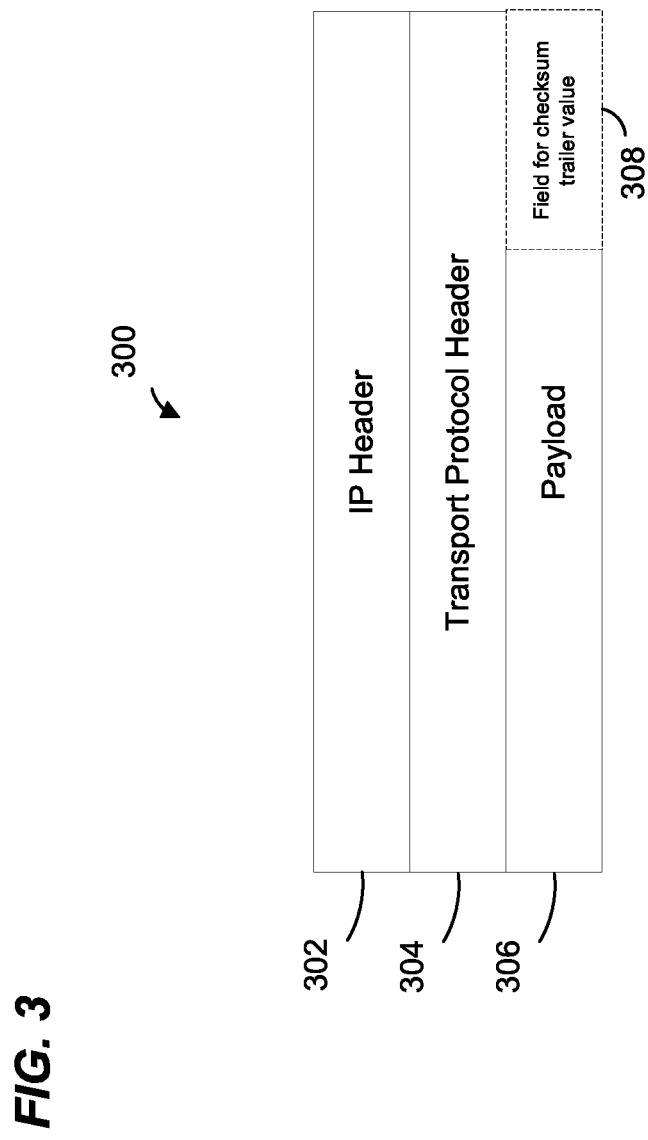
FIG. 3 is a diagram of an example timing packet, according to an embodiment.

FIG. 3 is a diagram of an example timing packet 300, according to an embodiment. In an embodiment, the timing packet 300 is the same as or similar to the timing packet 102 of FIG. 1. In another embodiment, the timing packet 300 is the same as or similar to the timing packet 212 of FIG. 2A and/or the timing packet 232 of FIG. 2B. The timing packet 300 includes an internet protocol header 302 and a transport protocol header 304. The IP header 302 corresponds to the IP header defined by the particular internet protocol being utilized for transmission of the timing packet 300. For example, in an embodiment in which the IPv4 protocol is being utilized, the IP header 302 corresponds to the IPv4 header as defined by the IPv4 protocol. As another example, in an embodiment in which the IPv6 protocol is being utilized, the IP header 302 corresponds to the IPv6 header as defined by the IPv6 protocol. Similarly, the transport protocol header 304 corresponds to the header defined by the particular transport protocol being utilized as a transport for the timing packet 300. For example, in an embodiment in which the UDP protocol is used as a transport protocol, the transport header 304 corresponds to UDP header defined by the UDP protocol. The timing packet 300 also includes a payload portion 306, such as UDP payload. In an embodiment, the payload portion 306 of the timing packet 300 includes a field 308 that can be used by an intermediate node to include a checksum trailer value in the timing packet 300 to maintain correctness of a checksum (e.g., a UDP checksum) when the timing packet 300 is modified by the intermediate node, according to an embodiment. According to an embodiment, the field 308 used for including the checksum trailer value is a field specified by the timing protocol for use other than the checksum trailer, such as a padding field, an extension field, or another field not specifically defined by the timing protocol for use as a checksum trailer field.

Figure 4:
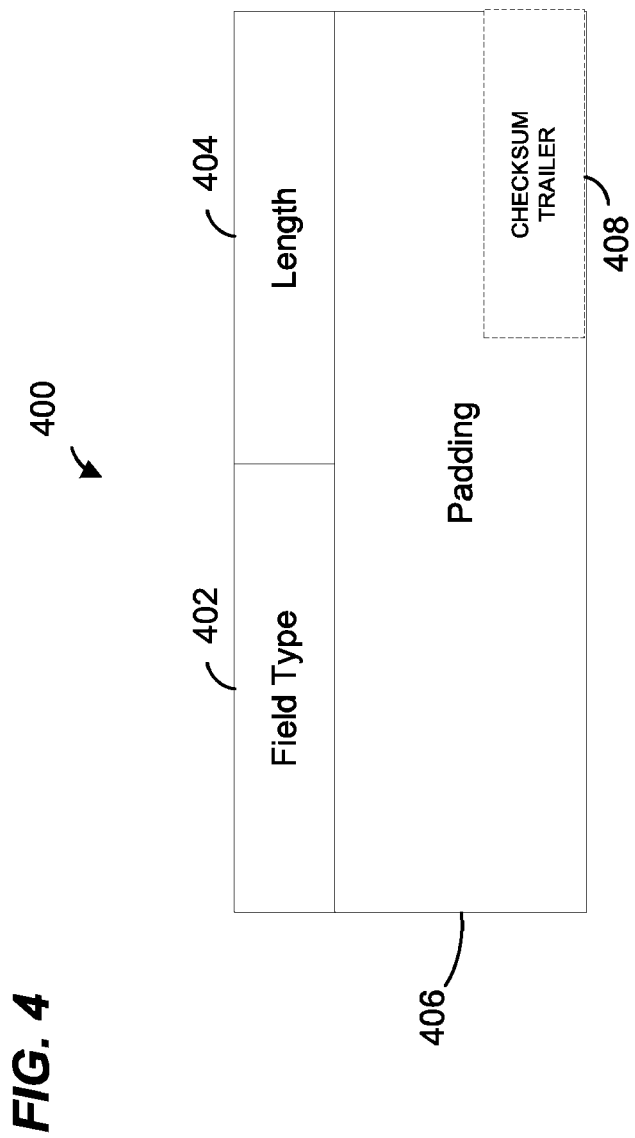
FIG. 4 is a diagram of an example field included in a timing packet to allow an intermediate node to include a checksum trailer value in the timing packet, according to an embodiment.

FIG. 4 is a diagram of an example field 400 included in a timing packet to allow an intermediate node to include a checksum trailer value in the timing packet, according to an embodiment. In an embodiment, the field 308 of FIG. 3 is the same as or similar to the field 400. The field 400 is an extension field that conforms to the NTP protocol version 4 (NTPv4), for example. The NTPv4 protocol is defined in Mills et al., "Network Time Protocol Version 4: Protocol and Algorithms Specification," Request for Comments 5905, Internet Engineering Task Force, June 2010, which is hereby incorporated herein by reference in its entirety. The extension field 400 includes a field type subfield 402, a length subfield 404, and a padding subfield 406. In an embodiment, the field type subfield 402 is used to signal to an intermediate node that field 400 is intended to be used by the intermediate node for a checksum trailer. The length subfield 404 is used to indicate the length of the extension field 400. In an embodiment, the length of the extension field 400 is 16 octets, a minimum extension field length specified by the NTPv4 protocol. In an embodiment, the padding subfield 406 is a padding field used to fill the extension field 400 to a word boundary, for example. In an embodiment, padding bits in the padding subfield 406 are all set to a value of zero (0). The padding field 406 is eight octets long, according to an embodiment. In an embodiment, an intermediate node is configured to set the last two octets of the padding field 406 to the checksum trailer value, as indicated in FIG. 4 by the checksum trailer 408.

Figure 5:
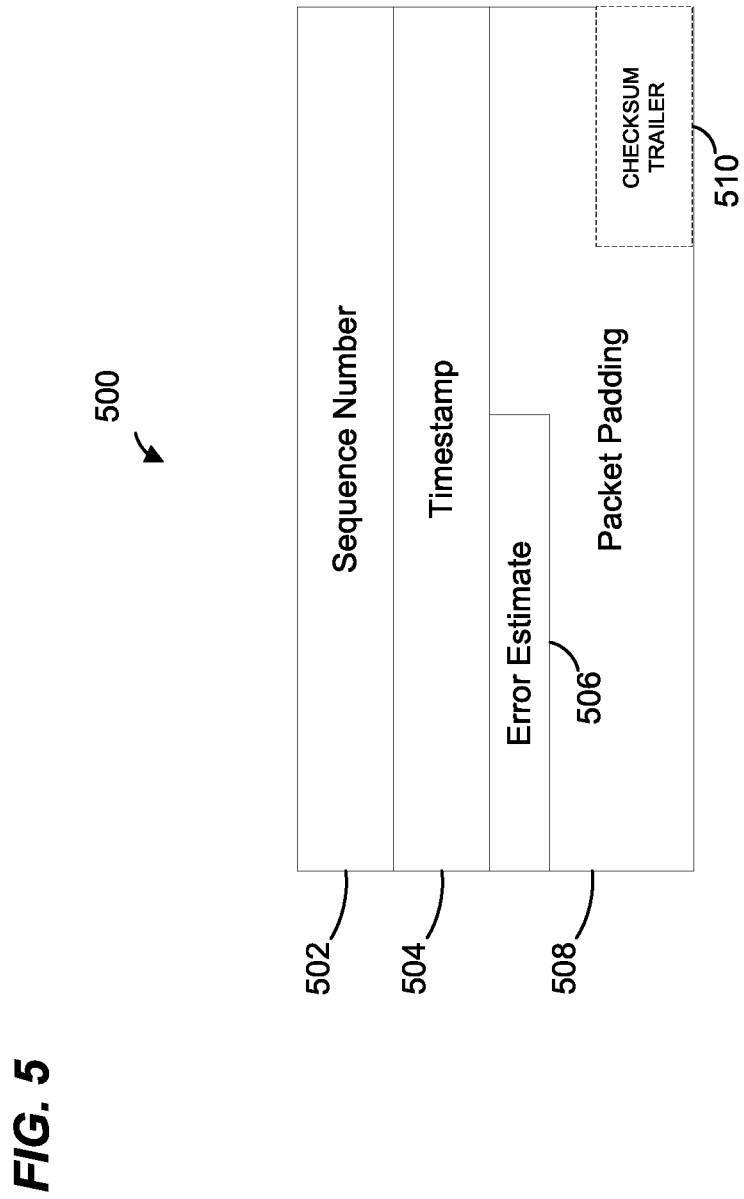
FIG. 5 is a diagram of a timing packet that includes a field that can be used by an intermediate node to include a checksum trailer value in the timing packet, according to an embodiment.

FIG. 5 is a diagram of a packet 500 that includes a padding field 508 that can be used by an intermediate node to include a checksum trailer value in the packet 500, according to an embodiment. Referring to FIG. 3, in one embodiment, the data packet 500 is the payload portion 306 of the timing packet 300. The packet 500 conforms to an OWAMP or a TWAMP packet format (specified, by the OWAMP or the TWAMP protocol, respectively). The OWAMP protocol is defined in Shalunov et al., "A One-Way Active Measurement Protocol (OWAMP)," Request for Comments 4656, Internet Engineering Task Force, September 2010, which is hereby incorporated herein by reference in its entirety. The TWAMP protocol is defined in Hedayat et al., "A Two-Way Active Measurement Protocol (TWAMP)," Request for Comments 5357, Internet Engineering Task Force, October 2008, which is hereby incorporated herein by reference in its entirety.

The packet 500 includes a sequence number field 502, a timestamp field 504, an error estimate field 506, and a padding field 508. In an embodiment, the packet padding field 508 is used by an intermediate node to include a checksum trailer value in a timing packet. In an embodiment, an intermediate node includes a checksum trailer value at the end padding subfield 508, for example by setting the last two octets of the padding field 508 to the checksum trailer value, as indicated in FIG. 5 by the checksum trailer 510. In an embodiment, in accordance with the OWAMP or the TWAMP protocol, a length of the packet padding field 508 is established by a transmitting node that generates the packet 500 during session initiation with a receiving node. For example, in an embodiment, the transmitting node transmits a session request message to the receiving node and includes the padding field length in the session request, for example in a "padding length" field of the session request message. According to an embodiment, the length of the padding field 508, as announced during session initiation, is at least enough to allow an intermediate node to include a checksum trailer value in the padding field 508. In one embodiment, the length of the padding field 508 is two octets (corresponding to a two-octet length of a checksum trailer).

It is noted that in some embodiments, in accordance with the timing protocol, to enhance the security of packet transmission, timing packets are encoded with a message authentication code (MAC). In at least some such embodiments, in addition to including a checksum trailer value in a timing packet, an intermediate node that modifies the timing packet is also configured to modify the message authentication code of the timing packet accordingly.

Figure 6:
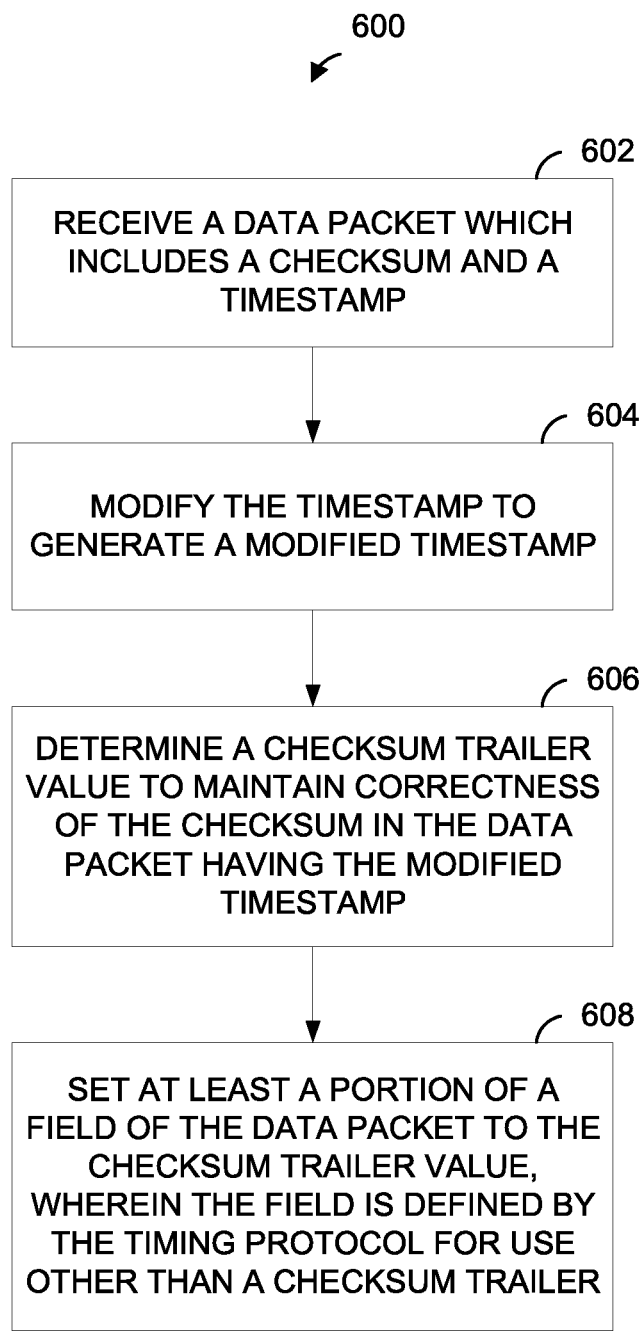
FIG. 6 is a flow diagram of an example method for processing data packets in accordance with a timing protocol, according to an embodiment.

FIG. 6 is a flow diagram of an example method 600 for processing data packets in accordance with a timing protocol, according to an embodiment. With reference to FIG. 1, the method 600 is implemented by the packet processor 120, in an embodiment. Referring to FIGS. 2A-2B, the method 600 is implemented by the intermediate 204 or the intermediate node 224, according to another embodiment. In other embodiments, the method 600 is implemented by other suitable network device components and/or other suitable network devices.

A block 602, a data packet which includes a checksum and a timestamp is received. In an embodiment, the timing packet 102 of FIG. 1 is received. In another embodiment, the timing packet 212 of FIG. 2A or the timing packet 232 of FIG. 2B is received. In another embodiment, another data packet is received.

At block 604, the timestamp of the data packet received at block 602 is modified. For example, the timestamp is modified to compensate for variable latency through an intermediate network device, such as a switch, according to one embodiment. In another embodiment, the timestamp is modified by a hardware component, such as an ASIC, to include a more accurate timestamp is a data packet generated by a software component, such as a CPU. At block 606, a checksum trailer value is determined such that the correctness of the checksum in the data packet is maintained after the timestamp field is modified at block 604.

At block 608, at least a portion of a field of the data packet received at block 602 is set to the checksum trailer value determined at block 606. The field is defined by the timing protocol for use other than a checksum trailer, according to an embodiment. In an embodiment, at least a portion of the extension field 400 of FIG. 4 (e.g., the portion of the extension field 400 indicated as the checksum trailer 408 in FIG. 4) is set to the checksum trailer value at block 608. In another embodiment, at least a portion of the packet padding subfield 508 of FIG. 54 (e.g., the portion of the padding field 508 indicated as the checksum trailer 510 in FIG. 4) is set to the checksum trailer field at block 608. In other embodiments, at least a portion of another field defined by the timing protocol for use other than a checksum trailer is set to the checksum trailer value at block 608.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any computer readable storage medium such as on a magnetic disk, an optical disk, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for processing data packets in accordance with a timing protocol, the method comprising:
receiving a data packet, wherein the data packet includes i) a checksum and ii) a timestamp;
modifying the timestamp to generate a modified timestamp;
determining a checksum trailer value to maintain correctness of the checksum in the data packet having the modified timestamp;
setting at least a portion of a field of the data packet to the checksum trailer value, wherein the field is defined by the timing protocol for use other than a checksum trailer.

2. A method according to claim 1, wherein setting at least a portion of the field of the data packet to the checksum trailer value comprises setting at least a portion of a padding field of the data packet to the checksum trailer value.

3. A method according to claim 2, further comprising, in a session initiation, establishing a length of the padding field.

4. A method according to claim 3, wherein establishing the length of the padding field comprises establishing the length to be at least two octets.

5. A method according to claim 1, setting at least a portion of the field of the data unit to the checksum trailer value comprises setting at least a portion of an extension field of the data packet to the checksum trailer value.

6. A method according to claim 5, wherein the length of the extension field is at least sixteen octets.

7. A method according to claim 5, wherein the extension field includes at least i) an extension field type subfield that indicates a field type, ii) a length subfield that indicates a length of the extension field, and iii) a padding subfield;
wherein the checksum trailer value is added in the padding subfield.

8. A method according to claim 1, wherein the timing protocol is one of i) one way active measurement protocol; ii) two way active measurement protocol, and iii) network time protocol.

9. An apparatus for processing a data packet in accordance with a timing protocol, the apparatus comprising:
a packet processor configured to receive the data packet, wherein the data packet includes i) a checksum and ii) a timestamp;
a timestamp modifier configured to modify the timestamp to generate a modified timestamp;
a checksum trailer determination unit configured to determine a checksum trailer value to maintain correctness of the checksum of the data packet including the modified timestamp; and
a field modifier unit configured set at least a portion of a field of the data packet to the checksum trailer value, wherein the field is defined by the timing protocol for use other than a checksum trailer.

10. An apparatus according to claim 9, wherein the field modifier unit is configured to set at least a portion of a padding field of the data packet to the checksum trailer value.

11. An apparatus according to claim 10, wherein a length of the padding field is established via session initiation.

12. An apparatus according to claim 11, wherein the length of the padding field is at least two octets.

13. An apparatus according to claim 9, wherein the field modifier unit is configured to set at least a portion of an extension field of the data packet to the checksum trailer value.

14. An apparatus according to claim 13, wherein a length of the extension field is at least sixteen octets.

15. An apparatus according to claim 9, wherein the extension field includes at least i) an extension field type subfield that indicates a field type, ii) a length subfield that indicates a length of the extension field, and iii) a padding subfield;
wherein the checksum trailer value is added in the padding subfield.

16. An apparatus according to claim 9, wherein the timing protocol is one of i) one way active measurement protocol; ii) two way active measurement protocol, and iii) network time protocol.

17. A communication system configured to operate according to a timing protocol, the communication system comprising:
an intermediate node configured to:
receive a data packet, wherein the data packet includes i) a checksum and ii) a timestamp;
modify the timestamp to generate a modified timestamp;
determine a checksum trailer value to maintain correctness of the checksum in the data packet having the modified timestamp;
set at least a portion of a field of the data packet to the checksum trailer value, wherein the field is defined by the timing protocol for use other than a checksum trailer; and
transmit the data packet having the modified timestamp; and
a receiving node configured to:
receive the data packet having the modified timestamp transmitted by the intermediate node;
calculate a checksum for the data packet using the field that includes the checksum trailer value;
interpret the field that includes the checksum trailer value according to the timing protocol.

18. A communication system according to claim 17, wherein the timing protocol is one of i) one way active measurement protocol; ii) two way active measurement protocol, and iii) network time protocol.

19. A communication system according to claim 17, wherein the field that includes the checksum trailer is an extension field of the data packet.

20. A communication system according to claim 17, wherein the field that includes the checksum trailer is a padding field of the data packet.

* * * * *